(12) United States Patent
Adachi et al.

(10) Patent No.: US 8,838,386 B2
(45) Date of Patent: Sep. 16, 2014

(54) METHOD FOR TRANSMITTING LOCATION INFORMATION ON A DIGITAL MAP, APPARATUS FOR IMPLEMENTING THE METHOD, AND TRAFFIC INFORMATION PROVISION/RECEPTION SYSTEM

(75) Inventors: Shinya Adachi, Kanagawa (JP); Satoko Miyama, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 156 days.

(21) Appl. No.: 12/649,547

(22) Filed: Dec. 30, 2009

(65) Prior Publication Data

US 2010/0106410 A1    Apr. 29, 2010

Related U.S. Application Data

(63) Continuation of application No. 12/110,952, filed on Apr. 28, 2008, now Pat. No. 8,219,314, which is a continuation of application No. 10/075,208, filed on Feb. 14, 2002, now abandoned.

(51) Int. Cl.
| | | |
|---|---|---|
| G01C 21/26 | (2006.01) | |
| G08G 1/0967 | (2006.01) | |
| G09B 29/10 | (2006.01) | |
| G01C 21/30 | (2006.01) | |

(52) U.S. Cl.
CPC ...... *G08G 1/09675* (2013.01); *G08G 1/096775* (2013.01); *G09B 29/106* (2013.01); *G01C 21/30* (2013.01); *G08G 1/096716* (2013.01)
USPC ............................ 701/532; 243/118; 243/458

(58) Field of Classification Search
USPC ................... 701/208, 409, 532; 342/118, 458
See application file for complete search history.

(56) References Cited

U.S. PATENT DOCUMENTS

| | | | |
|---|---|---|---|
| 4,807,127 A | 2/1989 | Tehmoku et al. | |
| 4,819,175 A | 4/1989 | Wuttke | |
| 4,893,246 A | 1/1990 | Iihoshi et al. | |
| 4,924,699 A | 5/1990 | Kuroda et al. | |
| 4,930,888 A | 6/1990 | Freisleben et al. | |
| 4,963,864 A | 10/1990 | Iihoshi et al. | |
| 4,963,865 A | 10/1990 | Ichikawa et al. | |

(Continued)

FOREIGN PATENT DOCUMENTS

| | | |
|---|---|---|
| EP | 0478438 B1 | 12/1995 |
| EP | 0875877 A2 | 11/1998 |

(Continued)

*Primary Examiner* — Tuan C. To
(74) *Attorney, Agent, or Firm* — Pearne & Gordon LLP

(57) ABSTRACT

Location information transmission apparatus for exchanging information about the on-road location on a digital map, characterized in that apparatus at an information provider comprises a location information converter for converting transmit on-road location information to road shape data including the on-road location consisting of a string of coordinates representing the road shape of a road section having a length that depends on the situation and relative data indicating the on-road location in the road section, and that apparatus at a party receiving the on-road location information comprises a shape matching section for performing shape matching by using the road shape data, identifying the road section on a digital map and identifying the on-road location in the road section by using the relative data. This makes it possible to correctly exchange information about the location on a digital map without defining node numbers or link numbers on a road network.

16 Claims, 7 Drawing Sheets

(56) References Cited

U.S. PATENT DOCUMENTS

| | | | |
|---|---|---|---|
| 4,984,168 A | 1/1991 | Neukrichner et al. | |
| 5,025,261 A * | 6/1991 | Ohta et al. | 342/357.25 |
| 5,040,122 A | 8/1991 | Neukirchner et al. | |
| 5,046,011 A | 9/1991 | Kakihara et al. | |
| 5,067,082 A | 11/1991 | Nimura et al. | |
| 5,214,757 A | 5/1993 | Mauney et al. | |
| 5,307,278 A | 4/1994 | Hermans et al. | |
| 5,311,195 A | 5/1994 | Mathis et al. | |
| 5,442,559 A | 8/1995 | Kuwahara et al. | |
| 5,488,559 A | 1/1996 | Seymour | |
| 5,563,607 A * | 10/1996 | Loomis et al. | 342/357.44 |
| 5,564,004 A * | 10/1996 | Grossman et al. | 715/835 |
| 5,572,649 A * | 11/1996 | Elliott et al. | 715/788 |
| 5,598,534 A * | 1/1997 | Haas | 712/219 |
| 5,604,676 A * | 2/1997 | Penzias | 705/417 |
| 5,736,941 A | 4/1998 | Schulte et al. | |
| 5,742,923 A | 4/1998 | Odagawa | |
| 5,745,865 A | 4/1998 | Rostoker et al. | |
| 5,748,107 A | 5/1998 | Kersken et al. | |
| 5,757,285 A | 5/1998 | Grabow et al. | |
| 5,790,121 A * | 8/1998 | Sklar et al. | 715/853 |
| 5,797,112 A | 8/1998 | Komatsu et al. | |
| 5,802,492 A * | 9/1998 | DeLorme et al. | 455/456.5 |
| 5,812,069 A | 9/1998 | Albrecht et al. | |
| 5,826,212 A | 10/1998 | Nagai | |
| 5,828,322 A | 10/1998 | Eberhard | |
| 5,839,087 A | 11/1998 | Sato | |
| 5,842,146 A | 11/1998 | Shishido | |
| 5,850,190 A | 12/1998 | Wicks et al. | |
| 5,862,511 A | 1/1999 | Croyle et al. | |
| 5,899,954 A | 5/1999 | Sato | |
| 5,905,451 A | 5/1999 | Sakashita | |
| 5,908,466 A | 6/1999 | Veugen et al. | |
| 5,926,118 A | 7/1999 | Hayashida et al. | |
| 5,933,094 A | 8/1999 | Goss et al. | |
| 5,933,100 A | 8/1999 | Golding | |
| 5,948,043 A | 9/1999 | Mathis | |
| 5,966,135 A * | 10/1999 | Roy et al. | 345/619 |
| 5,974,356 A | 10/1999 | Doyle et al. | |
| 5,977,885 A | 11/1999 | Watanabe | |
| 5,990,809 A | 11/1999 | Howard | |
| 5,995,023 A | 11/1999 | Kreft | |
| 5,996,409 A | 12/1999 | Funk et al. | |
| 6,002,981 A | 12/1999 | Kreft | |
| 6,006,161 A | 12/1999 | Katou | |
| 6,012,012 A | 1/2000 | Fleck et al. | |
| 6,028,537 A * | 2/2000 | Suman et al. | 340/988 |
| 6,031,600 A | 2/2000 | Winner et al. | |
| 6,035,253 A | 3/2000 | Hayashi et al. | |
| 6,038,559 A | 3/2000 | Ashby et al. | |
| 6,061,627 A | 5/2000 | Sato | |
| 6,064,319 A | 5/2000 | Matta | |
| 6,073,075 A * | 6/2000 | Kondou et al. | 701/516 |
| 6,097,313 A | 8/2000 | Takahashi et al. | |
| 6,104,338 A * | 8/2000 | Krasner | 342/357.24 |
| 6,104,480 A | 8/2000 | Matzo et al. | |
| 6,107,940 A | 8/2000 | Grimm | |
| 6,107,941 A | 8/2000 | Jones | |
| 6,108,603 A | 8/2000 | Karunanidhi | |
| 6,111,521 A | 8/2000 | Mulder et al. | |
| 6,111,523 A | 8/2000 | Mee | |
| 6,114,973 A | 9/2000 | Winner et al. | |
| 6,115,668 A | 9/2000 | Kaneko et al. | |
| 6,137,564 A | 10/2000 | Schmidt et al. | |
| 6,150,961 A | 11/2000 | Alewine et al. | |
| 6,163,752 A | 12/2000 | Sievers et al. | |
| 6,169,955 B1 | 1/2001 | Fultz | |
| 6,169,956 B1 | 1/2001 | Morimoto et al. | |
| 6,178,377 B1 | 1/2001 | Ishihara et al. | |
| 6,178,378 B1 | 1/2001 | Leibold | |
| 6,188,959 B1 | 2/2001 | Schupfner | |
| 6,192,314 B1 | 2/2001 | Khavakh et al. | |
| 6,208,268 B1 | 3/2001 | Scarzello et al. | |
| 6,212,473 B1 | 4/2001 | Stefan et al. | |
| 6,223,125 B1 | 4/2001 | Hall | |
| 6,230,099 B1 | 5/2001 | Fabian | |
| 6,230,100 B1 | 5/2001 | Geier | |
| 6,232,917 B1 | 5/2001 | Baumer et al. | |
| 6,233,518 B1 | 5/2001 | Lee | |
| 6,236,336 B1 | 5/2001 | Oliva et al. | |
| 6,236,933 B1 | 5/2001 | Lang | |
| 6,240,368 B1 | 5/2001 | Kreft | |
| 6,244,111 B1 | 6/2001 | Funk | |
| 6,249,740 B1 * | 6/2001 | Ito et al. | 701/200 |
| 6,249,754 B1 | 6/2001 | Neul et al. | |
| 6,263,276 B1 | 7/2001 | Yokoyama et al. | |
| 6,263,343 B1 * | 7/2001 | Hirono | 707/770 |
| 6,266,609 B1 | 7/2001 | Fastenrath | |
| 6,268,825 B1 | 7/2001 | Okada | |
| 6,281,807 B1 | 8/2001 | Kynast et al. | |
| 6,281,808 B1 | 8/2001 | Glier et al. | |
| 6,324,468 B1 | 11/2001 | Meis et al. | |
| 6,335,695 B1 | 1/2002 | Kawasaki | |
| 6,438,490 B2 | 8/2002 | Ohta | |
| 6,542,816 B1 | 4/2003 | Ito et al. | |
| 6,680,694 B1 * | 1/2004 | Knockeart et al. | 342/357.09 |
| 6,687,611 B1 | 2/2004 | Hessing et al. | |
| 7,010,567 B2 | 3/2006 | Mori | |
| 2001/0001847 A1 | 5/2001 | Hessing | |
| 2001/0007088 A1 | 7/2001 | Winter et al. | |
| 2001/0047242 A1 | 11/2001 | Ohta | |
| 2002/0004701 A1 | 1/2002 | Nakano | |
| 2002/0040270 A1 | 4/2002 | Kwak et al. | |
| 2002/0080617 A1 | 6/2002 | Niwa et al. | |
| 2002/0082767 A1 | 6/2002 | Mintz | |
| 2002/0091486 A1 | 7/2002 | Hubschneider et al. | |
| 2002/0194170 A1 | 12/2002 | Israni et al. | |
| 2003/0018744 A1 | 1/2003 | Johanson et al. | |
| 2003/0060970 A1 | 3/2003 | Edge | |

FOREIGN PATENT DOCUMENTS

| | | | |
|---|---|---|---|
| EP | 1022578 A2 | 7/2000 | |
| EP | 1 102 228 A2 | 5/2001 | |
| EP | 1098168 A2 | 5/2001 | |
| EP | 1102036 A1 | 5/2001 | |
| EP | 1122517 A2 | 8/2001 | |
| EP | 1167923 A2 | 1/2002 | |
| JP | 10-83497 | 3/1989 | |
| JP | 03229288 A * | 10/1991 | |
| JP | 4-17100 | 1/1992 | |
| JP | 08261775 A * | 10/1996 | |
| JP | 09126788 A * | 5/1997 | |
| JP | 11-160091 | 6/1999 | |
| JP | 11-187456 | 7/1999 | |
| JP | 2001066146 | 3/2001 | |
| WO | 98-27530 | 6/1998 | |
| WO | 98-45724 | 10/1998 | |
| WO | 99-24787 | 5/1999 | |
| WO | 99-56081 | 11/1999 | |
| WO | 99-56264 | 11/1999 | |
| WO | 00-08616 | 2/2000 | |
| WO | 00-49530 | 8/2000 | |
| WO | 00-50845 | 8/2000 | |
| WO | 01-18769 A1 | 3/2001 | |

* cited by examiner

METHOD FOR TRANSMITTING LOCATION INFORMATION ON A DIGITAL MAP, APPARATUS FOR IMPLEMENTING THE METHOD, AND TRAFFIC INFORMATION PROVISION/RECEPTION SYSTEM

This application is a continuation of U.S. patent application Ser. No. 12/110,952 filed Apr. 28, 2008, which is a continuation of U.S. patent application Ser. No. 10/075,208 filed Feb. 14, 2002, which is incorporated herein by reference in its entirety.

BACKGROUND OF THE INVENTION

1. Field of the Invention

The present invention relates to an information transmission method for transmitting location information such as traffic jams and accidents for example in a traffic information provision system and apparatus for exchanging location information using the method, and in particular to such a method and apparatus that can correctly report a location on a digital map.

2. Description of the Related Art

In recent years, the number of vehicles that have car-mounted navigation apparatus has been increasing rapidly. The car-mounted navigation system has a digital map database and is capable of displaying the map around the vehicle on a screen based on the latitude/longitude data received by a GPS receiver as well as displaying the travel locus and the result of search for a route to the destination on the map.

In Japan, digital map databases are prepared by several companies. The problem is that map data contains errors inherent in the reduced-scale map. The errors depend on individual digital maps. Some of the maps on the market drawn on the scale of 1:25000 contain errors of about 50 meters depending on the location.

Latitude/Longitude data obtained from a GPS receiver may contain errors of several tens of meters.

Some models of car-mounted navigation apparatus on the market receives traffic jam information and accident information from a traffic information provision system and displays the traffic jam and accident locations on the map or performs route search using such information as additional search conditions.

In a related art traffic information provision system, as shown in FIG. 7, traffic information is provided from a traffic information collecting center 71 that has local jurisdiction over an area to an information delivery center 72. Traffic information edited for each transmission medium including FM broadcasts, road beacons and cell phones is transmitted via respective media.

The traffic information collecting center 71 exchanges traffic information with a traffic information collecting center 78 in other areas to collect traffic information in a wide service area including the peripheral areas.

In the traffic information, for example, in case latitude/longitude data on the location is presented alone in order to report a traffic jam location or accident location, various errors are contained depending on the kind of digital map database of the car-mounted navigation apparatus as mentioned earlier. Thus, different accident locations on the road could be recognized by the car-mounted navigation apparatus retaining a digital map database from Company A and the car-mounted navigation apparatus retaining a digital map database from Company B.

In order to alleviate incorrect information transmission, as shown in FIG. 8A, crossings a and b on a road network are assumed as nodes, and a road c connecting the nodes as a link. Each node is assigned a node number uniquely representing the node (a=1111, b=3333). Each link is assigned a link number uniquely representing the link (c=11113333). In the digital map database of each company, the node numbers and link numbers thus assigned are stored, in correspondence with each crossing and road.

In traffic information provision service, a point on the road is represented by first specifying a link number then the distance in meters from the start of the link. For example, a display "Location 200 meters from the start of the road with link number=11113333" allows the user to obtain the location P on the same road by tracing the road with link number=11113333 as far as 200 meters from the node with node number 1111, irrespective of what digital map data is used by the car-mounted navigation system in question.

Node numbers and link numbers defined on a road network must be changed to new numbers in case a road d is constructed or a road is modified as shown in FIG. 8B. Such modifications to node numbers and link numbers require updating of digital map data from each company.

Construction of or modification to a road continue into the future. As long as on-road location representation is made using node numbers and link numbers, maintenance of digital map databases is permanently accompanied by huge workload and resulting costs.

The information delivery center must send information that complies with past node numbers and link numbers for a predetermined period, for example three to five years, as well as the information of the latest year, in order to support navigation systems sold in the past. This causes huge maintenance workload.

SUMMARY OF THE INVENTION

The invention solves such related art problems and aims at providing a location information transmission method that can transmit a location on a digital map without excessive maintenance workload and apparatus for implementing the method.

In a location information transmission method according to the invention, an information provider transmits on-road location information by using road shape data consisting of a string of coordinates representing the road shape of a road section having a length that depends on the situation and relative data indicating the on-road location in the road section. A party receiving the on-road location information performs shape matching to identify the road section on the digital map and uses relative data to identify the on-road location in this road section.

In location information transmission apparatus according to the invention, apparatus at an information provider comprises a location information converter for converting transmit on-road location information to road shape data consisting of a string of coordinates representing the road shape of a road section having a length that depends on the situation and relative data indicating the on-road location in the road section. Apparatus at a party that receives the on-road location information comprises a shape matching section for performing shape matching by using the received road shape data, identifying the road section on a digital map and identifying the on-road location in the road section by using the relative data.

Thus, it is possible to correctly transmit a location on a digital map as well as the travel direction of the vehicle without defining node numbers or link numbers on a road network.

DESCRIPTION OF THE PREFERRED EMBODIMENTS

Figure 1:
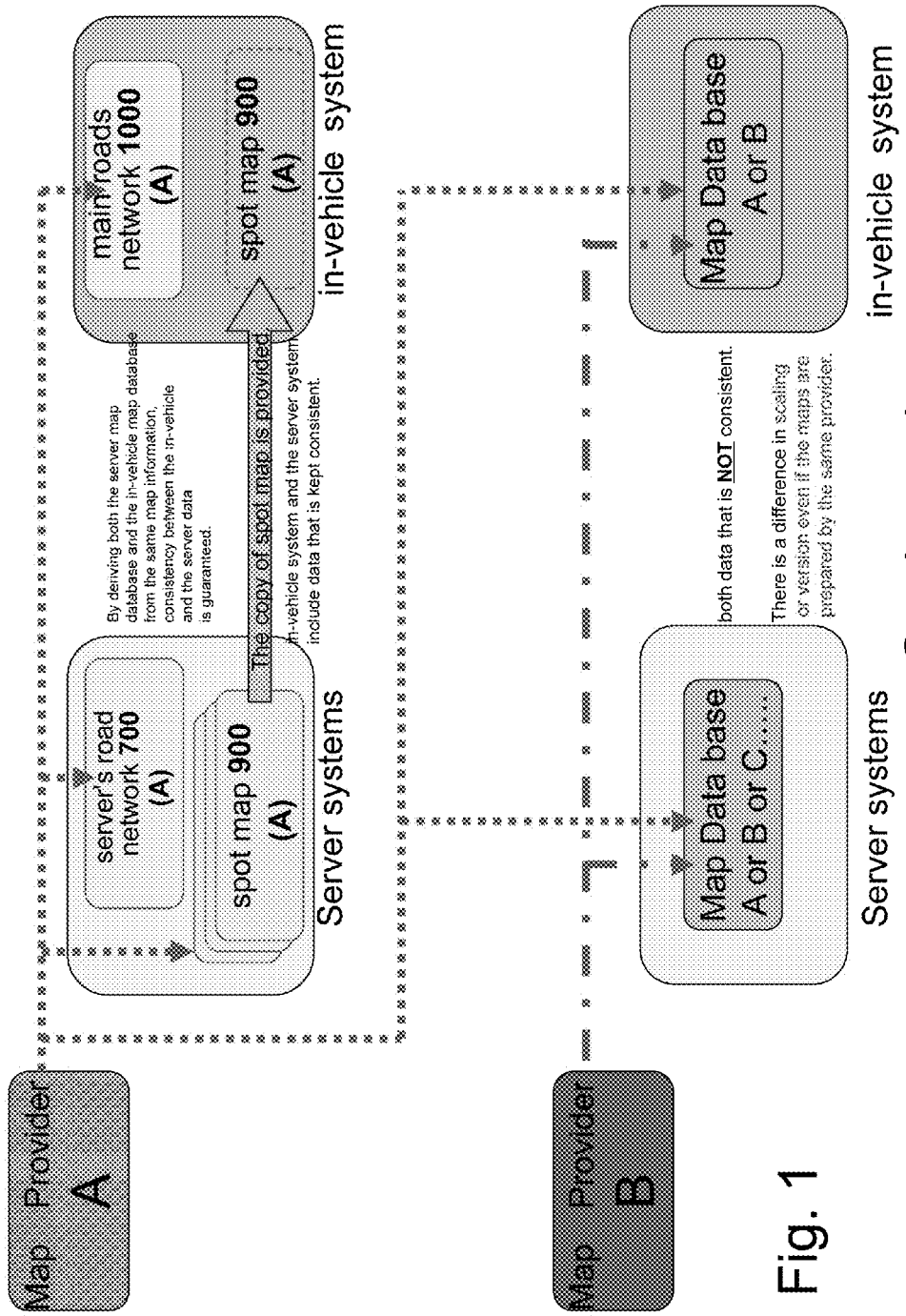
FIG. 1 is a block diagram showing a configuration of location information transmission apparatus in the first embodiment of the invention.

The first aspect of the invention is a location information transmission method for transmitting on-road location on a digital map, characterized in that an information provider transmits on-road location information by using road shape data including the on-road location information consisting of a string of coordinates representing the road shape of a road section having a length that depends on the situation and relative data indicating the on-road location in the road section and that a party receiving the on-road location information performs shape matching to identify the road section on the digital map and uses the relative data to identify the on-road location in the road section. This makes it possible to correctly report a location on a digital map without defining node numbers or link numbers on a road network.

The second aspect of the invention uses a string of coordinates arranging latitude/longitude data of the road point per predetermined distance interval as a string of coordinates representing the road shape. A party receiving the on-road location information uses the latitude/longitude data of each point to perform shape matching thus identifying the road section having the same road shape.

The third aspect of the invention uses distance data from a specific point in the road section as the relative data. A party receiving the on-road location information uses the distance data to identify the on-road location after identifying the road section.

The fourth aspect of the invention is location information transmission apparatus for exchanging information about the on-road location on a digital map, characterized in that apparatus at an information provider comprises a location information converter for converting transmit on-road location information to road shape data including the on-road location consisting of a string of coordinates representing the road shape of a road section having a length that depends on the situation and relative data indicating the on-road location in the road section, and that apparatus at a party receiving the on-road location information comprises a shape matching section for performing shape matching by using the road shape data, identifying the road section on a digital map and identifying the on-road location in the road section by using the relative data. This makes it possible to correctly exchange information about the location on a digital map without defining node numbers or link numbers on a road network.

The fifth aspect of the invention uses a string of coordinates arranging latitude/longitude data of the road point per predetermined distance interval as a string of coordinates representing the road shape. The shape matching section of the apparatus at a party receiving the on-road location information uses the latitude/longitude data of each road point to perform shape matching thus identifying the road section having the same road shape.

The sixth aspect of the invention uses distance data from a specific point in the road section as the relative data. The shape matching section of the apparatus at a party receiving the on-road location information uses the distance data to identify the on-road location after identifying the road section.

The seventh aspect of the invention is a traffic information provision/reception system to which location information transmission apparatus according to the fourth aspect of the invention is applied. This makes it possible to correctly report the location on a digital map without using node numbers or link numbers.

The eighth aspect of the invention is characterized in that apparatus at the information provider is a center for collecting traffic information in the area and that apparatus at the party receiving the on-road location information is a center for collecting traffic information in other areas. This makes it possible to use the location information transmission method for exchange of traffic information between centers.

The ninth aspect of the invention is characterized in that apparatus at the information provider is an infrastructure for providing traffic information and that apparatus at the party receiving the on-road location information is a car-mounted navigation apparatus. This makes it possible to use the location information transmission method for information provision to car-mounted navigation apparatus.

Embodiments of the invention will be described referring to the drawings.

First Embodiment

Figure 7:
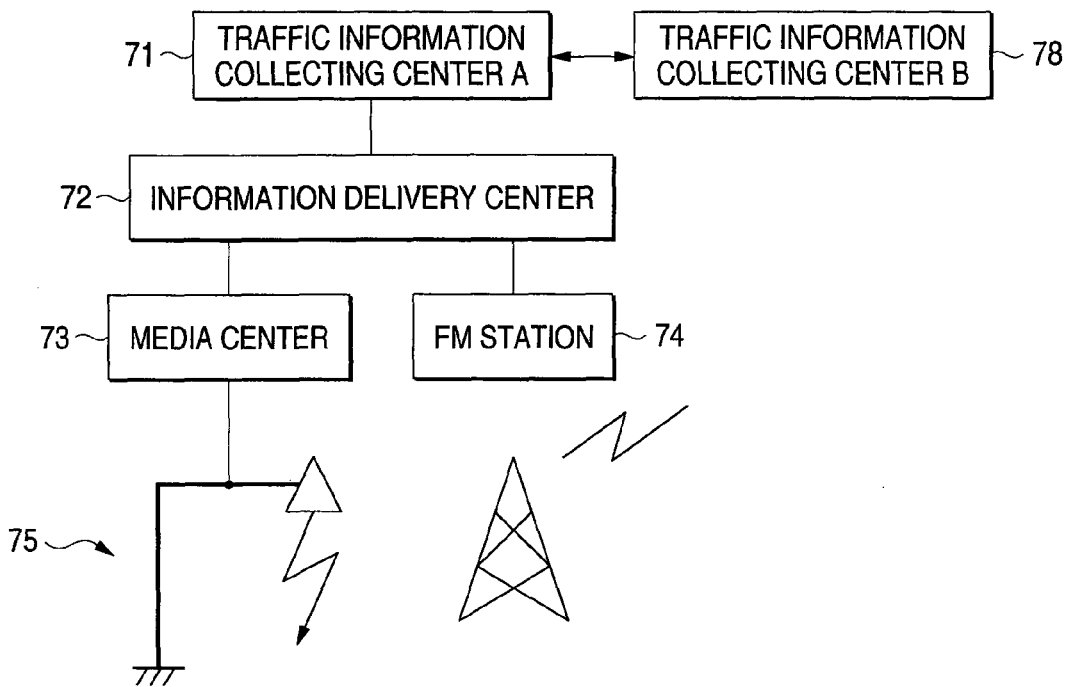
FIG. 7 is an explanatory drawing showing a traffic information provision system.
Figure 8A:
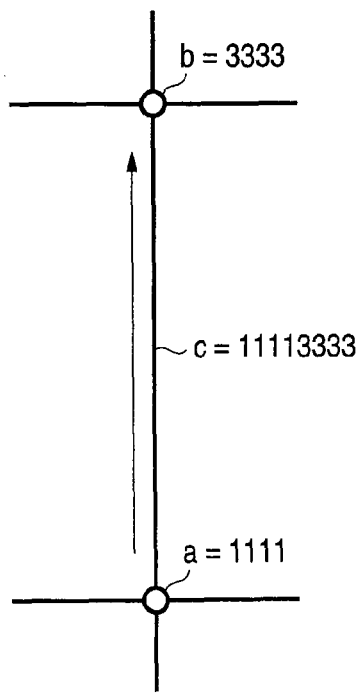
FIG. 8A is an explanatory drawing of node numbers and link numbers.
Figure 8B:
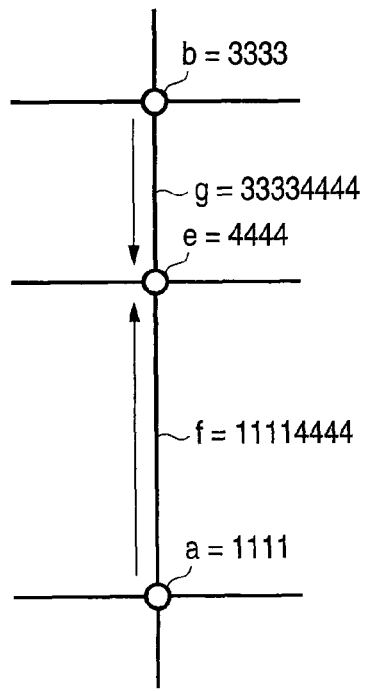
FIG. 8B is an explanatory drawing of modifications to node numbers and link numbers made when a new road is constructed.

In the first embodiment, a location information transmission method according to the invention will be described taking as an example the case where traffic information is exchanged between traffic information collecting centers in FIG. 7

The traffic information collecting center A, as shown in FIG. 1, comprises an event information input section 1 for inputting event information such as traffic accidents and traffic jams, a location information converter 2 for generating location information representing the event location, a location information transmitter 3 for transmitting the generated location information, a location information receiver 6 for receiving the location information, a shape matching section 5 for performing shape matching and identifying the event location from the location information, a digital map display section 4 for displaying the event location on a map, and a digital map database 7. The traffic information collecting center B has the same configuration as the traffic information collecting center A.

Figure 2:
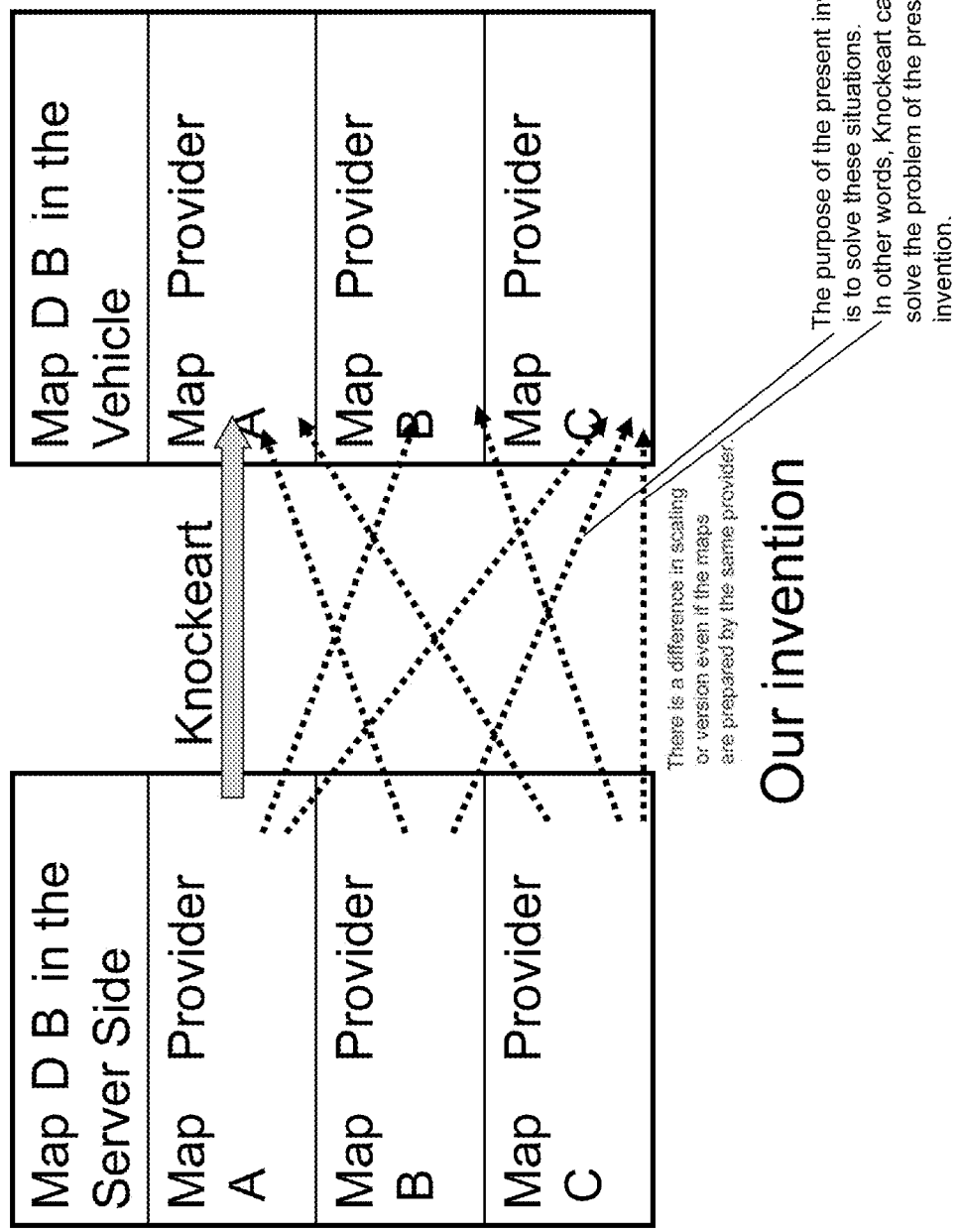
FIG. 2 is a flowchart showing the operation of location information transmission apparatus in the first embodiment of the invention.

Operation flow of the traffic information collecting center is shown in FIG. 2.

(Step 1) When an event such as a traffic accident or a traffic jam takes place, (Step 2) The event details and the event location information are input to the event information input section 1 of the traffic information collecting center. For example, when information indicating occurrence of a traffic jam is input to a vehicle detector installed on the road, (Step 3) the location information converter 2 generates road shape data including traffic jam location consisting of a string of coordinates representing the road shape of a road section having a predetermined length and distance data indicating the distance from the start point of the road section to the traffic jam location, in order to report the traffic jam information to the traffic information collecting center B.

Figure 3:
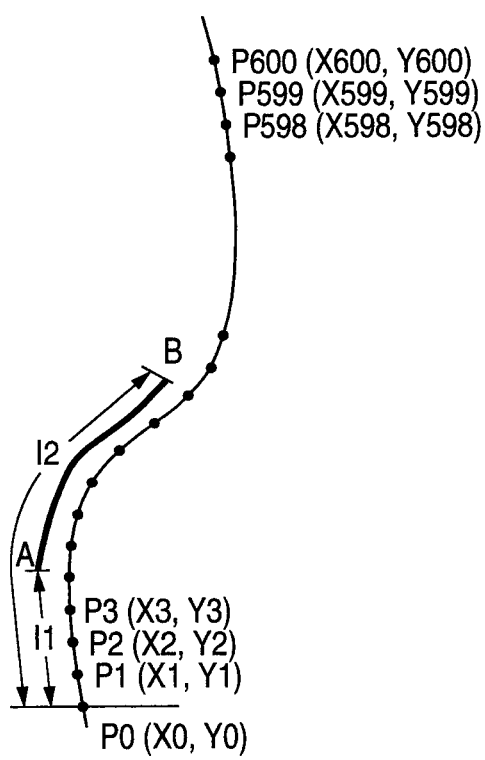
FIG. 3 is an explanatory drawing illustrating road shape data and distance data constituting the road location information.

FIG. 3 is a schematic view showing the location information generated by the location information converter 2. In case a traffic jam has occurred in the section A to B on the road, the road shape of the road including the section is represented in a string of coordinates consisting of 601 points in 5-meter intervals, $P_0 (x_0, y_0), P_1 (x_1, y_1), \ldots, p_{600} (x_{600}, y_{600})$. Here, $x_k$ and $y_k$ are latitude and longitude data, respectively, of the on-road point $p_k$ acquired from the digital database 7. Further, the distance $l_1$ from the point $P_0(x_0, y_0)$ to the traffic jam start point A and the distance $l_2$ from the point $P_0 (x_0, y_0)$ to the traffic jam end point B are obtained and the road shape data: $(x_0, y_0) (x_1, y_1) \ldots (x_{600}, y_{600})$ and traffic jam distance data: $l_1$ to $l_2$ m are generated as location information.

Rank information indicating the degree of traffic jam and information indicating the type of a digital map database used are added to the location information to create transmit information, and (Step 4) the location information transmitter 3 transmits the information to the traffic information collecting center B.

(Step 5) In the traffic information collecting center, receiving the information at the location information receiver 6, (Step 6) the shape matching section 5 performs shape matching of map data in the digital map database 7 and the string of coordinates indicating the road shape to identify the road section on the digital map, then identifies the traffic jam section on the digital map based on the distance data from the start point of the road section.

Figure 4:
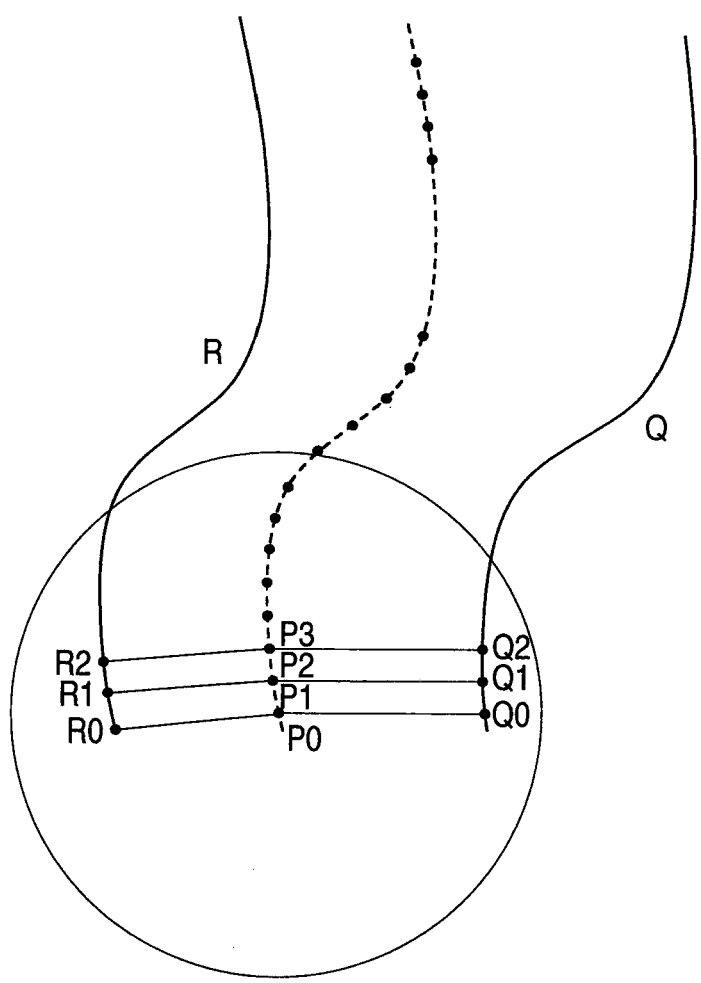
FIG. 4 is an explanatory drawing showing an example of shape matching.

FIG. 4 shows an example of shape matching.

Roads Q and R included within the error range around the $P_0 (x_0, y_0)$ point of map data read from the digital map database 7 are selected as candidates.

Then, locations $Q_0$, $R_0$ on each candidate road closest to $P_0 (x_0, y_0)$ are obtained and distance $P_0$-$Q_0$ and distance $P_0$-$R_0$ are calculated.

This operation is carried out for each point $P_0 (x_0, y_0)$, $P_1(x_1, y_1), \ldots, p_{600} (x_{600}, y_{600})$ and the road section where the summation value of the root mean square of the distances from each point $P_0, P_1, \ldots, p_{600}$ is smallest is obtained.

Then the section $l_1$-$l_2$ m from the start point of the road section is identified as a traffic jam section.

(Step 7) The digital map display section 4 reads data from the digital map database 7 and displays a map, then paints the colors corresponding to the traffic jam levels in the traffic jam section obtained by the shape matching section 5.

In this way, the party receiving information can perform shape matching and identify the road section having the road shape without defining node numbers or link numbers, when the information provider represents the road shape using a string of coordinates.

While the interval of points used to indicate the shape of the road section is 5 meters and the number of points is 601 in this embodiment, the interval and the number are not intended to limit the invention.

While latitude and longitude data is used as coordinate data in a string of coordinates in this embodiment, other coordinate data may be used so long as the data can be shared by the information provider and the information receiver.

By adding effective auxiliary information to the transmit location information, it is possible to enhance the efficiency of shape matching at the receiving party.

As a shape matching algorithm, a method other than the illustrated least square method may be used.

Second Embodiment

In the second embodiment, transmission of location information between the infrastructure of the traffic information provision system (information provider) and the car-mounted navigation apparatus will be described.

Here, infrastructure refers to such social infrastructures as broadcasting stations, traffic signs, traffic signal lights or traffic monitoring cameras and so on. The social infrastructures may involve centers to control the forementioned stations, signs or other elements that are parts of the infrastructure.

Figure 5:
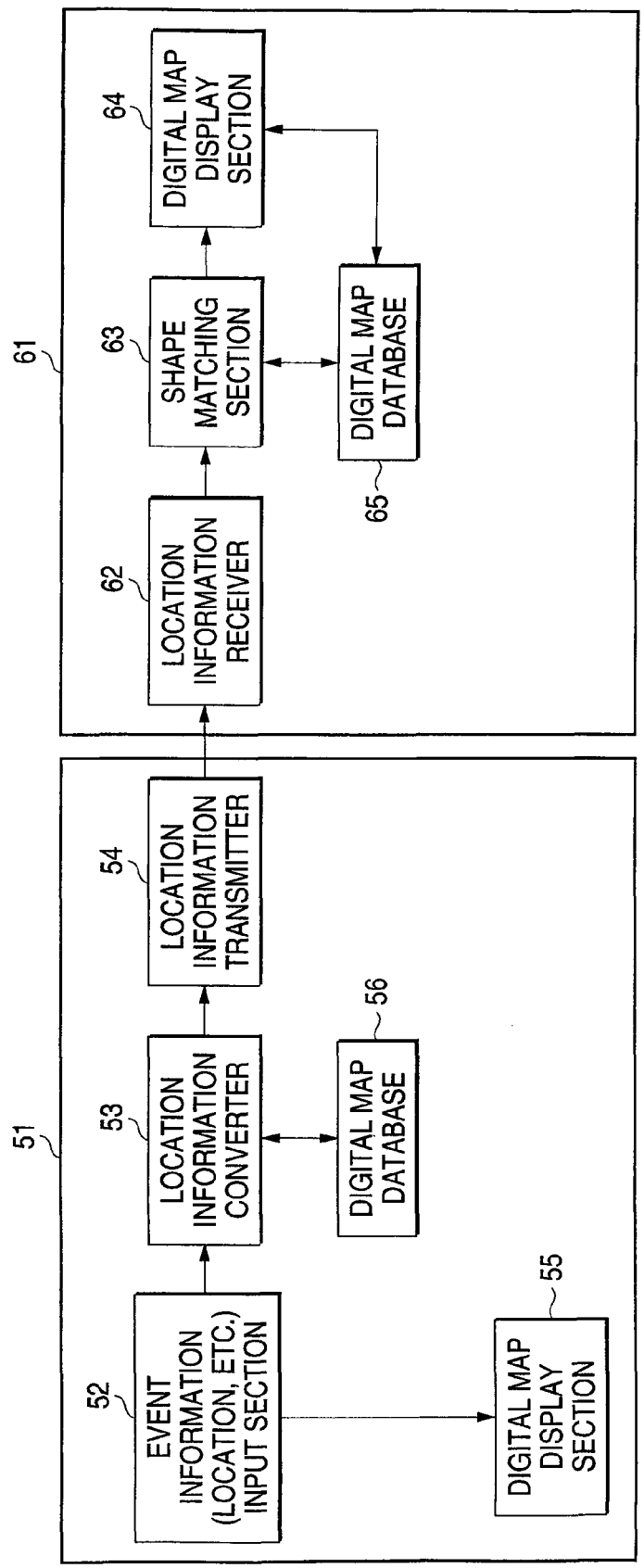
FIG. 5 is a block diagram showing a configuration of location information transmission apparatus in the second embodiment of the invention.

FIG. 5 shows an infrastructure 51 that provides information and car-mounted navigation apparatus 61 that receives information.

The infrastructure 51 comprises an event information input section 52 for inputting event information, a location information converter 53 for generating location information representing the event location, a location information transmitter 54 for transmitting the generated location information, a digital map display section 55, and a digital map database 56.

The car-mounted navigation apparatus 61 comprises a location information receiver 62 for receiving location information, a shape matching section 63 for performing shape matching and identifying the event location from the location information, a digital map display section 64 for displaying the event location on a map, and a digital map database 65.

Operation of the infrastructure is the same as the operation of step 1 through step 4 of FIG. 2. Operation of the car-mounted navigation apparatus is the same as the operation of step 5 through step 7 of FIG. 2.

In the traffic information provision system, the infrastructure provides information including the string of coordinates of the road section of a predetermined length including the event location and the information on the event location that uses the road section as a reference, via FM broadcasts and beacons. The car-mounted navigation apparatus identifies the road section from the string of coordinates and identifies the event location by using the road section as a reference. Thus, it is possible to correctly report the location on a digital map without defining node numbers or link numbers.

Figure 6:
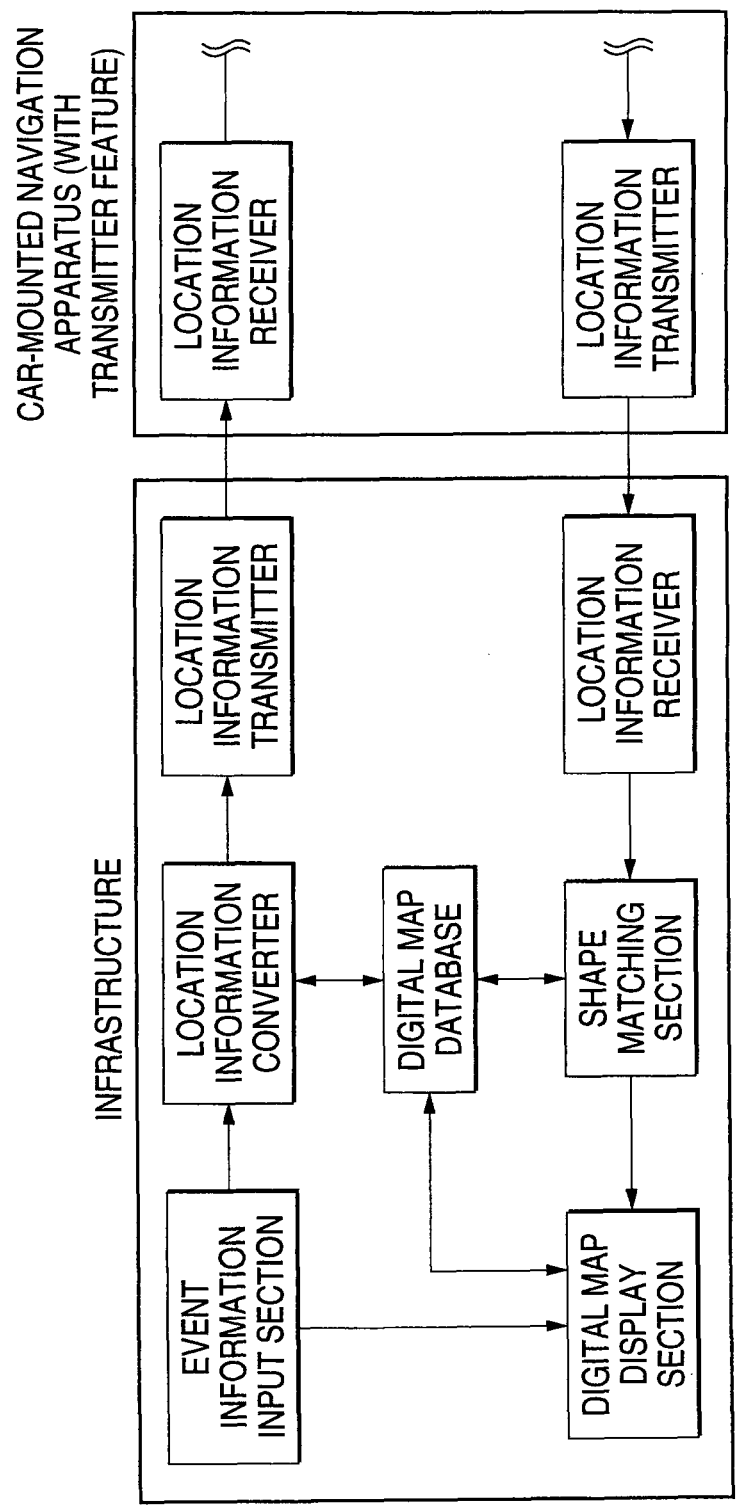
FIG. 6 is a block diagram showing another configuration of location information transmission apparatus in the second embodiment.

FIG. 6 shows a case where the car-mounted navigation apparatus comprises an event information input section, a location information converter, a location information transmitter, a location information receiver, a shape matching section, a digital map display section, and a digital map database. The car-mounted navigation apparatus can transmit the accident location to the infrastructure if an accident takes place.

In this practice, the car-mounted navigation apparatus acquires from the digital map database coordinate data of a plurality of locations in the road section of a predetermined length including the accident location. Then the car-mounted navigation apparatus transmits the coordinate data and information on the event location using the road section as a reference. The center receives the information and performs shape matching to identify the road section from the road shape, then identifies the accident location.

As understood from the foregoing description, a location information transmission method and apparatus can correctly report the location on a digital map to a distant party without using node numbers or link numbers on a road network.

With this method, it is possible to substantially reduce workload and costs for maintenance of digital map databases thus reducing the socials costs for maintaining the traffic information provision system.

What is claimed is:

1. A system for identifying a location of a road segment in digital maps, the digital maps including a first digital map and a second digital map, wherein the location of the road segment is identified on the second digital map which is prepared by a different provider from the first digital map or is prepared by a same provider as the first digital map and is in a different scaling from the first digital map, the system comprising:
the transmitting apparatus that has the first digital map and transmits the location information which indicates the road segment on the first digital map to the receiving apparatus; wherein the location information including:
coordinates information which indicates a list of coordinates of points on the road segment,
distance information including a distance from a start point of the road segment on the first digital map to a location where a traffic event occurred on the road segment on the first digital map,
the receiving apparatus that has the second digital map, the second digital map showing the road segment at a different location from the first digital map,
wherein after the receiving apparatus receives the location information from the transmitting apparatus, the receiving apparatus identifies the different location of the road segment shown on the second digital map by using the coordinates information included in the location information, and identifies the location of the traffic event on the road segment on the second digital map by using the distance from the start point to the location where the traffic event occurred.

2. A transmission apparatus adapted for operating as the transmission apparatus of the system according to claim 1.

3. A receiving apparatus adapted for operating as the receiving apparatus of the system according to claim 1.

4. The system according to claim 1, wherein each of the first digital map and the second digital map contains errors inherent in a reduced-scaling of each map and/or depending on a kind of each map.

5. The system according to claim 1, wherein the distance is a distance from the start point to a location of at least one of a traffic jam and a traffic accident.

6. The system according to claim 1, wherein the distance is a distance from the start point to a location of a traffic jam or accident.

7. The system according to claim 1, wherein the receiving apparatus identifies the different location of the road segment shown on the second digital map while keeping a difference in provider or scaling between the first digital map and the second digital map.

8. A method of identifying a location of a road segment in digital maps, the digital maps including a first digital map and a second digital map, wherein the location of the road segment is identified on the second digital map which is prepared by a different provider from the first digital map or is prepared by a same provider as the first digital map and is in a different scaling from the first digital map, the method comprising:
transmitting the location information which indicates the road segment on the first digital map from the transmitting apparatus, the second digital map showing the road segment at a different location from the first digital map;
wherein the location information including:
coordinates information which indicates a list of coordinates of points on the road segment,
distance information including a distance from a start point of the road segment on the first digital map to a location where a traffic event occurred on the road segment on the first digital map;
receiving the location information from the transmitting apparatus at the receiving apparatus;
identifying the different location of the road segment shown on the second digital map by using the coordinates information included in the received location information at the receiving apparatus, and
identifying the location of the traffic event on the road segment on the second digital map by using the distance from the start point to the location where the traffic event occurred.

9. The method according to claim 8, wherein each of the first digital map and the second digital map contains errors inherent in a reduced-scaling of each map and/or depending on a kind of each map.

10. The method according to claim 8, wherein the distance is a distance from the start point to a location of at least one of a traffic jam and a traffic accident.

11. The method according to claim 8, wherein the distance is a distance from the start point to a location of a traffic jam or accident.

12. The method according to claim 8, wherein the different location of the road segment shown on the second digital map is identified while keeping a difference in provider or scaling between the first digital map and the second digital map.

13. A system for identifying a location of a road segment in digital maps, each map containing errors inherent in a reduced-scaling of the digital maps and/or depending on the kind of the digital maps, the digital maps including a first digital map and a second digital map, the second digital map showing the road segment at a different location from the first digital map due to the errors, the system comprising:
the transmitting apparatus that has the first digital map and transmits the location information which indicates the road segment on the first digital map to the receiving apparatus; wherein the location information including:
coordinates information which indicates a list of coordinates of points on the road segment,
distance information including a distance from a start point of the road segment on the first digital map to a location where a traffic event occurred on the road segment on the first digital map,
the receiving apparatus that has the second digital map,
wherein after the receiving apparatus receives the location information from the transmitting apparatus, the receiving apparatus identifies the different location of the road segment shown on the second digital map by using the coordinates information included in the location information, and identifies the location of the traffic event on the road segment on the second digital map by using the distance from the start point to the location where the traffic event occurred.

14. A method for transmitting location information which indicates a road segment on a first digital map from a transmitting apparatus having the first digital map to a receiving apparatus having a second digital map, the receiving apparatus receiving the location information from the transmitting apparatus, identifying a location of the road segment on the second digital map by using coordinates information included in the received location information at the receiving apparatus, and identifying a location of a traffic event on the road segment on the second digital map by using a distance from the start point to the location where the traffic event occurred, the method comprising:

generating the location information which includes the coordinates information which indicates a list of coordinates of points on the road segment on the first digital map and the distance information including a distance from a start point of the road segment on the first digital map to a location where the traffic event occurred on the road segment on the first digital map; and transmitting the location information to the receiving apparatus, wherein the first digital map and the second digital map contain respective errors inherent in a reduced-scaling of each digital map, errors depending on the kind of the digital maps, or errors inherent in the reduced-scaling of the digital maps and depending on the kind of the digital maps, the second digital map showing the road segment at a different location from the first digital map due to the errors.

15. A method for identifying a location of a road segment in digital maps, the method comprising:

receiving location information which indicates a road segment on a first digital map from a transmitting apparatus at a receiving apparatus, wherein the location information includes coordinates information which indicates a list of coordinates of points on the road segment and distance information including a distance from a start point of the road segment on the first digital map to a location where a traffic event occurred on the road segment on the first digital map;

identifying a location of the road segment on a second digital map by using the coordinates information included in the received location information at the receiving apparatus; and identifying a location of the traffic event on the road segment on the second digital map by using the distance from the start point to the location where the traffic event occurred, wherein the first digital map and the second digital map contain respective errors inherent in a reduced-scaling of the digital maps, errors depending on the kind of the digital maps, or errors inherent in the reduced-scaling of the digital maps and depending on the kind of the digital maps, the second digital map showing the road segment at a different location from the first digital map due to the error.

16. A system for identifying a location of a road segment in digital maps, the digital maps including a first digital map and a second digital map, wherein the location of the road segment is identified on the second digital map which is prepared by a different provider from the first digital map or is prepared by a same provider as the first digital map and is in a different scaling from the first digital map, the system comprising:

the transmitting apparatus that has the first digital map and transmits the location information which indicates the road segment on the first digital map to the receiving apparatus; wherein the location information including:

coordinates information which indicates a list of coordinates of points on the road segment, distance information indicating a distance to a location where a traffic event occurred on the road segment on the first digital map, the receiving apparatus that has the second digital map, the second digital map showing the road segment at a different location from the first digital map, wherein after the receiving apparatus receives the location information from the transmitting apparatus, the receiving apparatus identifies the different location of the road segment shown on the second digital map by using the coordinates information included in the location information, and identifies the location of the traffic event on the road segment on the second digital map by using the distance information included in the location information.

\* \* \* \* \*